US005640991A

United States Patent [19]

King

[11] Patent Number: 5,640,991
[45] Date of Patent: Jun. 24, 1997

[54] SIPHON FREEZE DRAIN VALVE FOR UNDERGROUND IRRIGATION SYSTEMS

[75] Inventor: Thomas A. King, St. Louis, Mo.

[73] Assignee: Tom King Harmony Products, Inc., St. Louis, Mo.

[21] Appl. No.: 409,413

[22] Filed: Mar. 24, 1995

[51] Int. Cl.⁶ .................................................. F16K 24/04
[52] U.S. Cl. ........................... 137/107; 137/140; 137/152; 137/517; 239/111; 251/146; 285/197
[58] Field of Search ........................... 137/107, 140, 137/152, 517; 239/111; 251/146; 285/187

[56] References Cited

U.S. PATENT DOCUMENTS

| 514,733 | 2/1894 | Seifert | 137/140 |
|---|---|---|---|
| 673,546 | 5/1901 | Nye . | |
| 1,297,001 | 3/1919 | O'Shields | 137/302 |
| 1,438,973 | 12/1922 | Van Der Volgen | 137/107 |
| 3,779,276 | 12/1973 | King, Sr. | 137/107 |
| 4,248,258 | 2/1981 | Devitt et al. | 137/132 |
| 4,291,855 | 9/1981 | Schenkel et al. . | |
| 4,479,482 | 10/1984 | Cherington | 137/132 |
| 4,682,579 | 7/1987 | Bigham | 137/132 |
| 4,890,640 | 1/1990 | King, Sr. . | |

*Primary Examiner*—Gerald A. Michalsky
*Attorney, Agent, or Firm*—Grace J. Fishel

[57] ABSTRACT

Siphon freeze drain valve for an underground water sprinkling system including a line operating under water pressure, the drain valve being a U-shaped tube, one end of which is passed through a hole in the top of the line, the other end of which is outside the line at a lower level than the first end. A clamp and a seal holds the tube in the line against the force of the water in the line and prevents leaking around the tube. A check valve is in the end of the tube outside the line, the check valve selectively opened and closed to control flow through the tube and for establishing a siphon for draining the line.

10 Claims, 3 Drawing Sheets

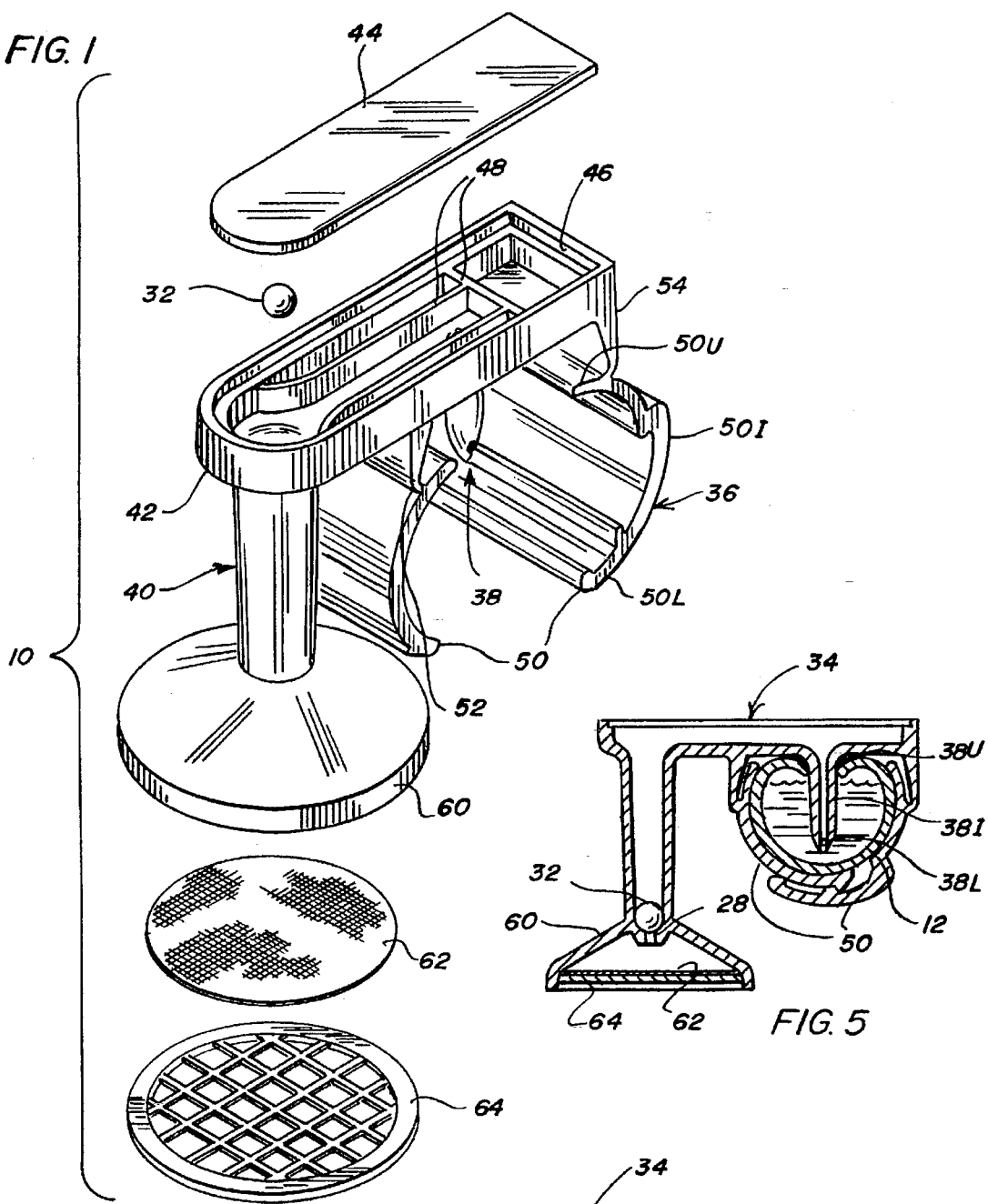
FIG. 1
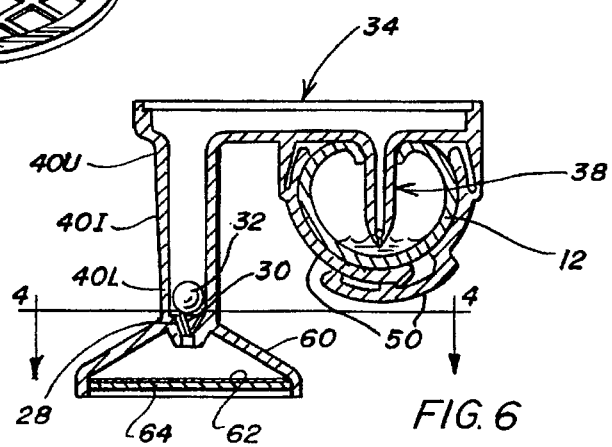
FIG. 5
FIG. 6

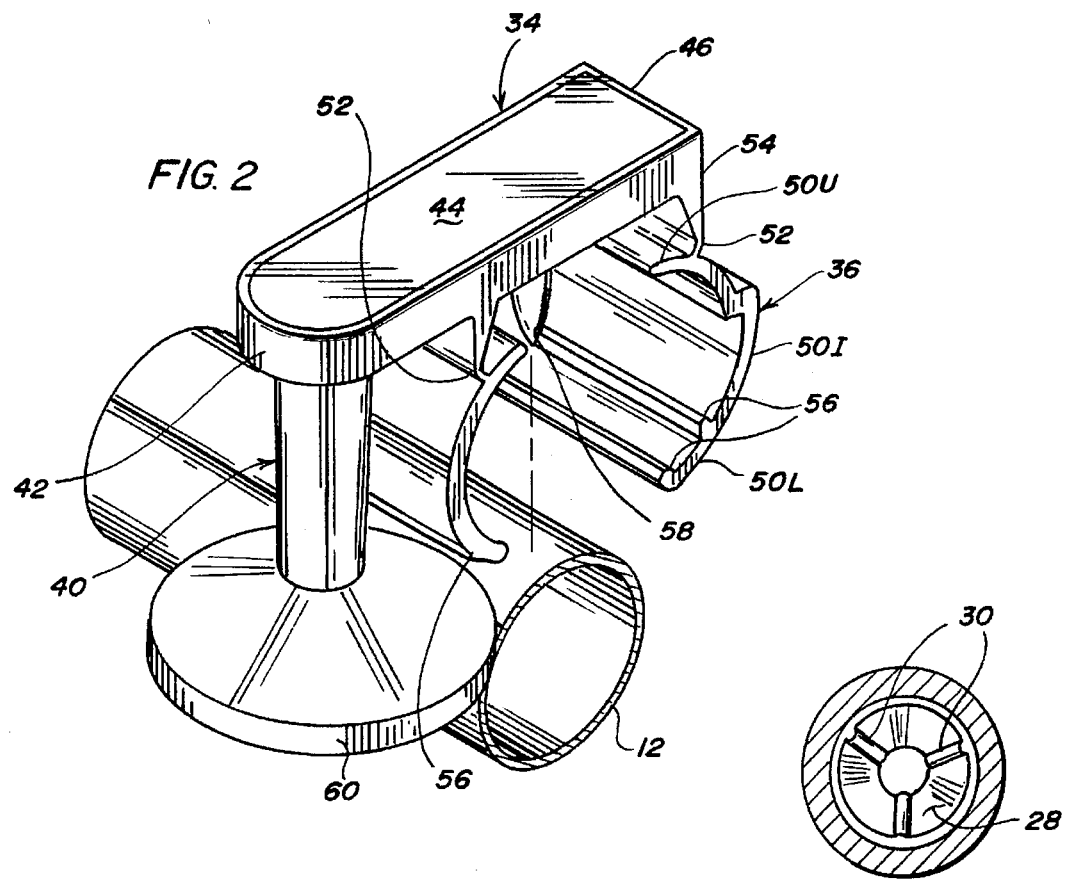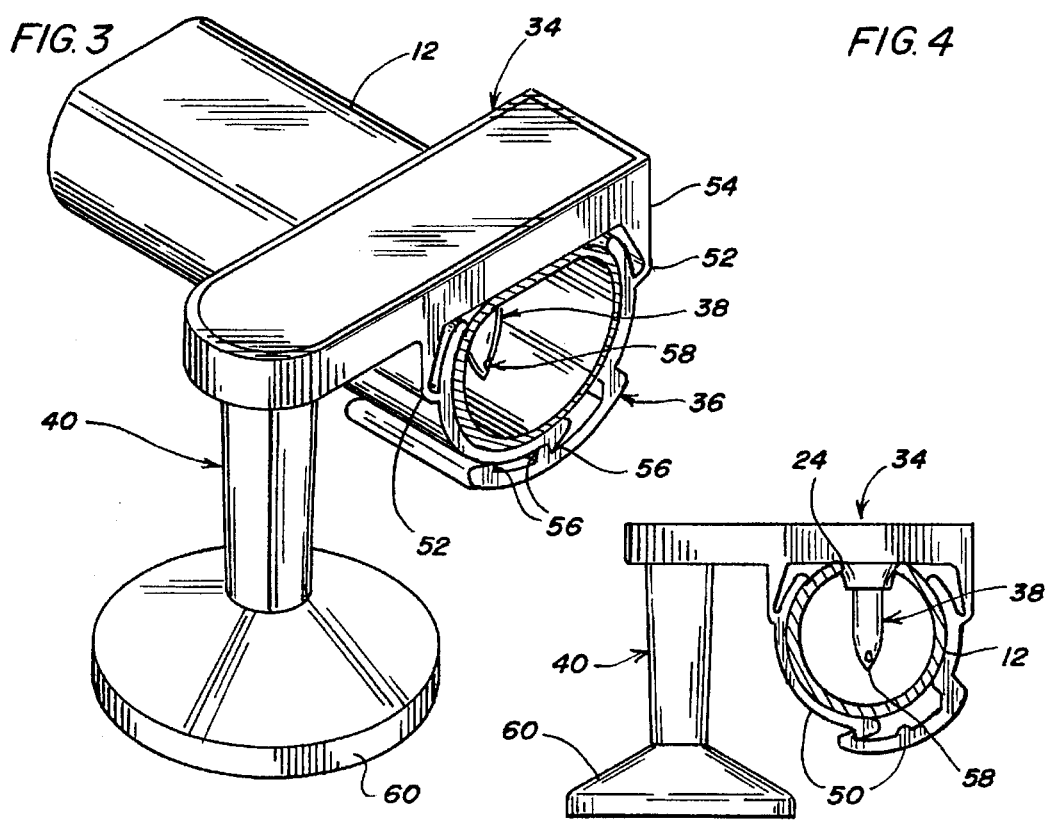

SIPHON FREEZE DRAIN VALVE FOR UNDERGROUND IRRIGATION SYSTEMS

BACKGROUND OF THE INVENTION

1. Field of the Invention

The present invention relates to a siphon freeze drain valve used primarily for freeze protection on underground irrigation systems to prevent freeze damage to irrigation components such as pipe, sprinkler heads, valves and other assemblies.

2. Brief Description of the Prior Art

An underground irrigation system includes a main water line and a plurality of lateral lines. Each lateral line is connected through a water zone valve to the main line and feeds one or more sprinkler heads. Typically the main line is formed of PVC pipe and has a larger diameter and operates at a higher pressure than the lateral lines which may be formed of polyethylene tubing. In other systems, the main line and/or the lateral lines can be formed of polyethylene tubing, PVC pipe, copper pipe, galvanized pipe, etc.

In those regions where the ground freezes, it is necessary to drain the main line and the lateral lines at the beginning of the winter season to protect the water zone valves, sprinkler heads and pipes from freeze damage. The old way is to use air pressure to blow the water out of the system, an operation that is relatively expensive and requires specialized equipment. The newer way is to provide a drain valve in the lines. Freeze drain systems can include special tees, elbows, water zone valve protectors, etc., each of which (sometimes color coded for the "D.I.Y." customer) is outfitted with a drain valve, a representative line of which the installer, retailer or distributor must inventory. Other systems use a standard male pipe threaded drain in combination with tees, elbows, etc.

The water zone valves, sprinkler heads and drain valves in an underground irrigation system are often installed after the main line and lateral lines have been laid in a trench dug with a trencher or driven into the ground with a vibratory plow, etc. To install a currently available freeze drain valve mid-line in polyethylene tubing, a hole must be dug to expose the tubing, the line cut, ends trimmed and an inverted tee with the drain valve inserted and a pair of clamps installed over the ends of the tee to maintain a seal between the tee and the water line. The cost of installing a drain valve thus includes the labor cost of digging the hole, cutting and trimming the tubing and installing the tee and clamps, while the materials cost includes the tee with the drain valve, materials to treat the ends of the tubing and the pair of clamps.

From the installer's, retailer's and distributor's standpoint to minimize inventory, it would be desirable if there was a universal drain valve that could be used at various locations in the main or lateral lines to protect the water zone valves, sprinkler heads, lines, etc. from freeze damage. From the installer's standpoint, it would also be desirable to minimize the amount of digging, to avoid cutting and trimming the tubing and to eliminate the clamps, reducing the cost of installing a drain valve while also reducing the chance that the installer will cut corners by failing to install a drain where one is called for in the plan because of the amount of labor involved in installing a typical freeze drain.

SUMMARY OF THE INVENTION

In view of the above, it is an object of the present invention to provide a siphon freeze drain valve that is less expensive in labor and materials to install. It is another object to provide a siphon freeze drain valve that can be used at various locations in a main or lateral line in an underground irrigation system to protect the water zone valves, sprinkler heads, lines, etc. from freeze damage. Other objects and features of the invention will be in part apparent and in part pointed out hereinafter.

In accordance with the invention, a siphon freeze drain valve is provided for a water line operating under water pressure. The siphon freeze drain valve has a tube with first and second ends, the first end passing though a hole in an upper side of the line and the second end being positioned below the first end with the tube making an inverted U-shaped bend between the first and second ends. A clamp holds the tube against the force of the water pressure in the line and means are provided for sealing the tube in the hole. There is a check valve in the second end of the tube that is selectively opened and closed to control the flow of water through the tube and for establishing a siphon for draining the line.

In a preferred form, the siphon freeze drain valve has a hollow base with a clamp, a hollow spike and a hollow leg, each of which depend from the same side of the base. The clamp includes a pair of opposing clamp segments having upper, lower and intermediate portions, each of said segments hinged along its intermediate portion to the base and having a locking part at its lower end portion. The locking parts provide locking means for releasably interconnecting the clamp segments when the clamp is pressed onto the line. The hollow spike has upper, lower and intermediate portions and is flowably connected to the base at its upper end intermediate the opposing clamp segments. The hollow needle is tapered into a point at its lower portion for insertion through a hole in the top side of the line when the clamp segments are releasably interconnected. The hollow leg has upper, lower and intermediate portions and the hollow leg is flowably connected to the hollow base at its upper end and extends below the lower portion of the hollow spike. The hollow leg has a check valve in its lower portion that is selectively opened and closed to control flow through the leg and for establishing a siphon for draining the line through the hollow spike.

In both drain valves described above, the check valve may have a tapered valve seat with at least one nub such as a radial rib and a resilient ball which is sealed in the valve seat by the force of the water pressure in the line and which is unseated, permitting water to flow between the ball and the nub, when the water pressure is reduced thereby establishing a siphon for draining the line.

The invention summarized above comprises the constructions hereinafter described, the scope of the invention being indicated by the subjoined claims.

BRIEF DESCRIPTION OF THE DRAWINGS

In the accompanying drawings, in which several of various possible embodiments of the invention are illustrated, corresponding reference characters refer to corresponding parts throughout the several views of the drawings in which:

FIG. 1 is an exploded perspective view of a siphon freeze drain valve in accordance with the present invention;

FIG. 2 is a perspective view of the siphon freeze drain valve before it is installed on a line in an underground irrigation sprinkler system;

FIG. 3 is a perspective view of the siphon freeze drain valve shown installed on the line;

FIG. 4 is a sectional view taken along line 4—4 in FIG. 6;

FIG. 5 is an elevational view in section of the siphon freeze drain valve installed on polyethylene tubing with the check valve closed by the force of the water pressure in the line;

FIG. 6 is an elevational view in section similar to FIG. 5 except that the check valve is open because the water pressure has been reduced;

FIG. 7 is an elevational view in section similar to FIG. 5 except showing the siphon freeze drain valve installed on a PVC pipe;

DETAILED DESCRIPTION OF THE INVENTION

Figure 8:
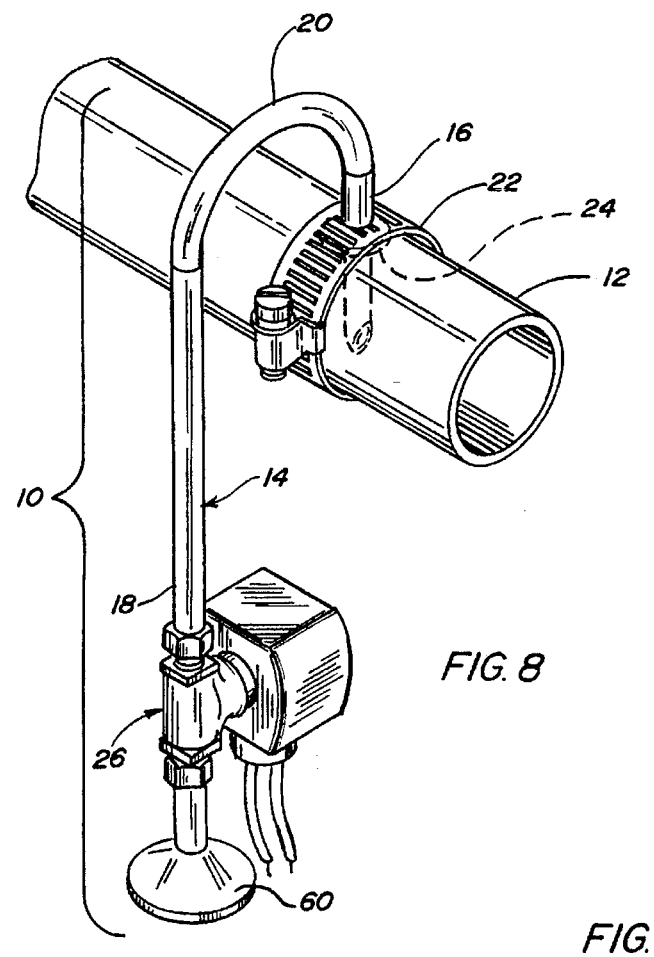
FIG. 8 is a perspective view of a second siphon freeze drain valve in accordance with the present invention; and, FIG. 9 is a side elevational view of a plurality of the siphon freeze drain valves shown in FIG. 1 protecting a water zone valve, sprinkler head, etc.

Referring to the drawings more particularly by reference character, reference numeral 10 refers to a siphon freeze drain valve for use on an underground water sprinkling system including a line 12 operating under water pressure. City water pressure typically is about 20 to 75 psi but the pressure in line 12 can be higher, for example, if the water is being pumped from a lake or if a booster pump is used. Polyethylene tubing for lines is usually designed to withstand 80 or 125 psi while PVC pipe may withstand pressures typically to 200 psi.

In principal part as shown in FIG. 8, siphon freeze drain valve 10 has a tube 14 with first and second ends, 16, 18, respectively. The first end of tube 16 passes through a hole in a top side of line 12 and the second end is positioned below the first with the tube making an inverted U-shaped bend 20 between the first and second ends. A clamp 22 has means 24 for sealing tube 14 in the hole and for holding it against the force of the water pressure in line 12. With continuing reference to FIG. 8, clamp 22 is a hose clamp and means 24, an elastomeric gasket. Other means 24, with or without a gasket, can be used for sealing tube 14 including, for example, friction fit between tube 14 and the hole in line 12 or glue. A check valve 26 is provided in the second end of tube 18 for selectively controlling the flow of water through the tube and for establishing a siphon for draining line 12. For this purpose, check valve 26 closes against the force of the water pressure in line 12 and opens when the water pressure is reduced.

As shown in FIG. 8, check valve 26 may be a solenoid that is activated either manually or automatically. In other embodiments, check valve 26 is mechanical and automatically closes under the force of the water pressure in line 12 and opens when the water pressure is reduced. Suitable check valves for this purpose may take various forms such as are used by others in drain valves or as described in the patent literature, e.g., U.S. Pat. Nos. 3,779,276 or 4,890,640 to King, and others. A preferred check valve is shown in FIGS. 4–6 and includes a tapered valve seat 28 having one or more nubs such as radial ribs 30 and a resilient ball 32. As will be readily appreciated, the same surface of ball 32 does not seat against ribs 30 each time the valve is closed, unlike some commercially available freeze drain valves, and is therefore expected to seat better. The resiliency of the ball is selected so that the ball is sealed against the valve seat under the force of the water pressure in line 12 (FIG. 5) and such that it is unseated, permitting water to flow between ball 32 and rib 30, when the water pressure is reduced (FIG. 6). For example, the ball may have a resiliency such that it is seated with a water pressure of 10 psi but is not forced through the valve seat under pressures of 80, 125 or even 200 psi, these particulars being matters of design choice. The height of rib 30 also affects valve performance and is a matter of design choice, satisfactory results being obtained with a rib about 0.005 inch high. A further improved drain valve 10 is described below.

Turning now to FIGS. 1–7 and 9, siphon freeze drain valve 10 includes a hollow base 34, with a clamp 36, a hollow intake spike 38 and a hollow leg 40. Base 34 may take the form of an elongated tray 42 closed with a cover 44, received in a notch or step provided in a top edge 46 of the tray, and may include transverse and longitudinal reinforcing ribs 48, serving the additional function of channeling the flow of water through the base between hollow intake spike 38 and hollow leg 40. Clamp 36 has a pair of opposing, arcuate clamp segments 50 having upper, lower and intermediate portions 50U, 50L, and 50I, respectively. Each of clamp segments 50 is hinged at 52 along its intermediate portion 50I, opposite the clamp segment which it opposes, to an arm 54 which depends from base 34. As shown in the drawings, hinge 52 is closer to upper portion 50U than lower portion 50L, facilitating entry of line 12 through the gap between the open segments. Each of segments 50 has a locking part 56 at the free end of its lower portion 50L, cooperating with the locking part at the free end of lower end portion 50L of the other clamp segment. Locking parts 56 provide locking means for releasably interconnecting the clamp segments when the clamp is pressed onto line 12 and, in preferred form as shown, have several locking positions for use with different diameter pipe or tubing.

Hollow intake spike 38 has upper, lower and intermediate portions 38U, 38L, and 38I, respectively and is flowably connected to base 34 at its upper portion, intermediate opposing clamp segments 50. Hollow intake spike 38 is preferably tapered into a point 58 at its lower portion 38L for insertion through a hole in the top side of line 12, the taper preferably starting at or near base 34 when hollow intake spike 38 is used as a punch for forming the hole. The length of intake spike 38 can be selected so as to remove the least amount of water necessary to avoid freeze damage thus conserving water during the watering season as the lateral lines are drained each time pressure is reduced. The orifice in intake spike 38 is positioned above the bottom of line 12 and the siphon is sufficiently weak that the suction does not tend to pick up debris from the bottom of line 12 which might plug the system.

Hollow leg 40 also has upper, lower and intermediate portions 40U, 40L and 40I, respectively, and is flowably connected to base 34 at its upper portion. Lower portion 40L extends below lower portion 38L of the hollow intake spike and has a check valve 26, as described above, that can be selectively opened and closed to control flow through the leg. As best seen in FIG. 1, when check valve 26 is in the form shown in FIGS. 4–6, lower portion 40L of leg below the valve flares into a bell 60 having a mouth into which is received a filter 62 held in place with a screen 64. Filter 62 prevents water backflow from carrying sand or soil into the leg where it could interfere with proper functioning of check valve 26 while also discouraging entry of roots.

Tray 42, hinged clamp segments 50, hollow intake spike 38 and hollow leg 40 may be integrally formed, preferably of ABS (acrylonitrile butadiene styrene copolymer) or other some other plastic such as polyvinyl chloride, polyethylene, etc. or of metal. Screen 64 and cover 44 are formed separately. Ball 32 is formed from natural or synthetic rubber or other elastomeric material and filter 62 of fiber mesh polyester or the like. Siphon freeze drain valve 10 is assembled by dropping ball 32 into hollow leg, after which cover 44 is attached by welding, gluing, or the like on top edge 46 of tray 42, forming a sealed cavity interconnecting hollow intake spike 38 and hollow leg 40. Filter 62 is fitted into the mouth of bell 60 and secured with screen 64 which is attached inside the bell. Assembly of siphon freeze drain valve 10 is easy and very few parts are spoiled.

In use, siphon freeze drain valve 10 shown in FIG. 8 can be installed at a low point in the line to drain the pipe or tubing or installed adjacent a sprinkling head, water zone valve or other component in need of freeze protection and can be used to replace the special tees, elbows, water zone valve protectors, etc., commonly used for that purpose. A hole is dug large enough to expose line 12 and a hole is drilled in line 12 and a grommet 24 installed. Tube 14 is then passed through the grommet such that first end 16 is spaced down from the top of the line about half the distance to the bottom or more. Clamp 22 and means 24 (i.e., the grommet) are used to seal tube 14 against the force of the water pressure in line 12 and to position second end 18 of tube 14 below the first. As line 12 is pressurized, tube 14 fills with water and check valve 26 is closed. When it is time to winterize the sprinkling system, the pressure in the line is reduced and check valve 26 opened. The weight of water below U-shaped bend 20 starts the flow of water through tube 14 and line 12 is drained until the siphon is broken when the level of water in the line falls below first end 16 of tube 14. When line 12 is a line larger than about 1½ inches, it may be preferred to use a solenoid as check valve 26 instead of a mechanical check valve such as shown in FIGS. 4–6. From the above, it is apparent that the siphon freeze drain valve shown in FIG. 8 is a universal drain valve, obviates the need to cut and trim the line to install a tee and eliminates the need for a pair of clamps to seal the ends of the tee into the line. The use of drain valve 10 shown in FIGS. 1–3, 5–7 and 9 is described below.

Siphon freeze drain valve 10 as shown in FIGS. 1–3, 5–7 and 9 may be used to punch a hole in the top of line 12 or with a line which has been drilled or punched with some other tool. When line 12 is formed of polyethylene, siphon freeze drain valve 10 can be used to punch a hole in the top of the line by digging down and around line 12 such that the valve can be position over the line as shown in FIG. 2, with clamp segments 50 open, and pushed down on the line. As the siphon freeze drain valve is pushed down as shown in FIG. 3, hollow spike 38 (which should be sharp enough that it pricks line 12 and does not slide off) punches a hole in line 12 while the line pushes against upper portions 50U of clamp segments 50 causing them to pivot around hinges 52 and lower portions to lock. The stretched plastic around the hole punched by intake spike 38 as shown in FIGS. 5 and 6 forms a seal against the water pressure in the line. No tools are needed to install siphon freeze drain valve 10 and there are no slugs to remove which might plug the system. There are also no O-rings or gaskets to dry out or get lost or be in need of replacement.

Figure 9:
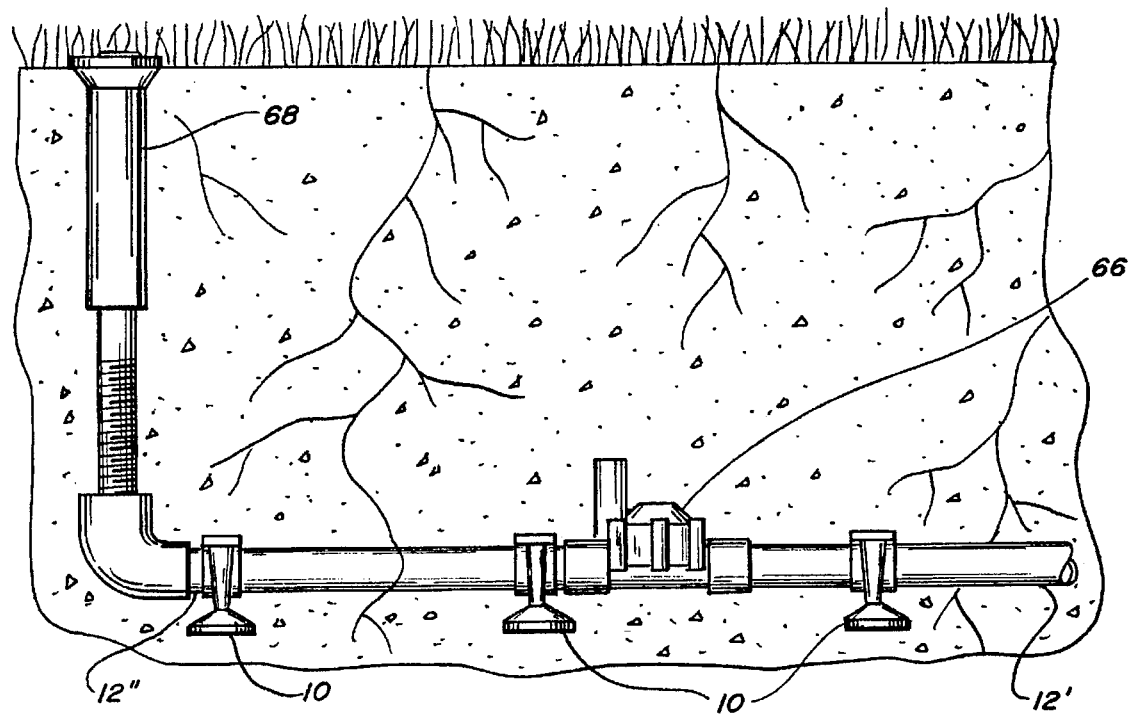

When line 12 is formed of PVC pipe or the like, a small hole is dug to expose the line and a hole drilled in the top of the line. Siphon freeze drain valve 10 is then installed as described above except that intake spike 38 is passed through grommet 24 and clamp 36 closed. In addition to being easier to install, siphon freeze drain valve 10 can be used at various locations in an underground irrigation system, e.g., as shown in FIG. 9, at a low point in a main or lateral line 12', 12", respectively, to protect a water zone valve 66, sprinkler head 68, etc., in place of specialized tees, tees, elbows, water zone valve protectors, etc. thereby decreasing the amount of inventory that the installer, retailer or distributor must carry. It will be understood that a line made from polyethylene tubing may also be drilled for attachment of siphon freeze drain valve 10, albeit there is little incentive because the line is so easily punched with hollow spike 38.

In the above-mentioned embodiments, the flow through the siphon freeze drain valve will increase as the difference between the first and second ends of the tube increases. This can be accomplished, for example, for a given length of tube by forming the hole in the water line off center of the top, thereby dropping the second end further below the first.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A siphon freeze drain valve for a water line operating under water pressure, said drain valve comprising a tube with first and second ends, said first end passing through a hole in an upper side of the line, said second end being positioned below the first end and said tube making a U-shaped bend between said first and second ends, a clamp with a means for sealing the tube in said hole and holding it against the force of the water pressure in the line, a check valve in the second end of the tube that is selectively opened and closed to control flow through the tube and for establishing a siphon for draining the line.

2. The siphon freeze drain valve of claim 1 for use in a line wherein the check valve is a solenoid valve.

3. The siphon freeze drain valve of claim 1 wherein the check valve automatically closes under the force of the water pressure in the line and opens when the water pressure is reduced.

4. A siphon freeze drain valve for an underground water sprinkling system including a line operating under water pressure, said drain valve comprising a tube with first and second ends, said first end passing through a hole in an upper side of the line, said second end being positioned below the first end and said tube making a U-shaped bend between said first and second ends, a clamp with means for sealing the tube in said hole and holding it against the force of the water pressure in the line, a check valve in the second end of the tube including a tapered valve seat with at least one nub and a resilient ball which is sealed in the valve seat by the force of the water pressure and which is unseated, permitting water to flow between the ball and the nub, when the water pressure is reduced thereby establishing a siphon for draining the line.

5. A siphon freeze drain valve for an underground water sprinkling system including a line operating under water pressure, said drain valve comprising a hollow base with a clamp, a hollow spike and a hollow leg, each of which depends from the same side of the base, said clamp including a pair of opposing clamp segments having upper, lower and intermediate portions, each of said segments hinged along its intermediate portion to the base and having a locking part at its lower end portion cooperating with the locking part at the lower end portion of the other clamp segment, said locking parts providing locking means for releasably interconnecting said clamp segments when the clamp is pressed onto the line, said hollow spike having upper, lower and intermediate portions, said hollow spike flowably connected to the base at its upper end, intermediate the opposing clamp segments, said hollow spike tapered into a point at its lower portion for insertion through a hole in the top side of the line, said hollow leg having upper, lower and intermediate portions, said hollow leg flowably connected to the hollow base at its upper end and extending below the lower portion of the hollow spike, said hollow leg having a check valve in its lower portion that is selectively opened and closed to control flow through the leg and for establishing a siphon for draining the line through the hollow spike.

6. The siphon freeze drain valve of claim 5 wherein the hollow base comprises an elongated tray with a cover and reinforcing ribs for channeling the flow of water through the base between the hollow intake spike and the hollow leg.

7. The siphon freeze drain valve of claim 6 wherein the check valve includes a tapered valve seat with at least one radial rib and a resilient ball which is sealed in the valve seat by the force of the water pressure in the line and which is unseated, permitting water to flow between the ball and the rib, when the water pressure is reduced thereby establishing a siphon for draining the line.

8. The siphon freeze drain valve of claim 7 wherein the hollow leg flares below the check valve into a bell having a mouth into which is received a filter held with a screen.

9. The siphon freeze drain valve of claim 8 wherein the tray, clamp, hollow spike and hollow leg are integrally molded and the cover and screen are molded separately.

10. The siphon freeze drain valve of claim 9 wherein the tray, clamp, hollow spike, hollow leg, cover and screen are molded of acrylonitrile butadiene styrene copolymer.

* * * * *